US006608864B1

(12) United States Patent
Strait

(10) Patent No.: US 6,608,864 B1
(45) Date of Patent: Aug. 19, 2003

(54) METHOD AND APPARATUS FOR FAULT RECOVERY IN A DECISION FEEDBACK EQUALIZER

(75) Inventor: Jeffrey C. Strait, Nevada City, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/320,258

(22) Filed: May 26, 1999

(51) Int. Cl.[7] .................................................. H04L 27/01
(52) U.S. Cl. ........................................ 375/233; 375/350
(58) Field of Search ................................. 375/233, 232, 375/229, 350, 260; 708/322, 323

(56) References Cited

U.S. PATENT DOCUMENTS

| 5,428,647 | A | * | 6/1995 | Rasky et al. ................. 370/350 |
| 5,461,640 | A |   | 10/1995 | Gatherer ..................... 375/231 |
| 5,479,447 | A |   | 12/1995 | Chow et al. ................. 375/260 |
| 5,517,527 | A | * | 5/1996 | Yu ............................... 375/233 |
| 5,627,863 | A |   | 5/1997 | Aslanis et al. .............. 375/357 |
| 5,636,244 | A | * | 6/1997 | Goodson et al. ............ 375/222 |
| 5,650,954 | A |   | 7/1997 | Minuhin |
| 5,668,802 | A |   | 9/1997 | Chalmers et al. ........... 370/276 |
| 5,673,290 | A |   | 9/1997 | Cioffi ......................... 375/260 |
| 5,748,686 | A | * | 5/1998 | Langberg et al. ........... 370/515 |
| 5,963,592 | A | * | 10/1999 | Kim ............................ 370/210 |
| 6,266,367 | B1 | * | 7/2001 | Strait ......................... 370/286 |
| 6,289,045 | B1 | * | 9/2001 | Hasegawa et al. .......... 375/231 |

* cited by examiner

Primary Examiner—Amanda T. Le
(74) Attorney, Agent, or Firm—McDonnell Boehnen Hulbert & Berghoff

(57) ABSTRACT

A method and apparatus for frequency domain equalization. The method and apparatus are particularly well suited for use in a receiver in a multicarrier transmission system that has predetermined symbols periodically embedded in the transmissions, such as in an ADSL system. The equalizer apparatus includes a digital filter having a plurality of single-tap filters. The filters operate on the symbols in the frequency domain, accepting frequency domain representations of the received symbols. The equalizer also includes a reference symbol generator that provides reference symbols, a coefficient generator that accepts the equalized frequency domain symbols from the digital filter and the reference symbols and updates the filter taps using a received predetermined symbol and the reference symbol. The coefficient generator includes a generator filter having a first and a second adaptation increment, an error generator, and a threshold detector that controls the coefficient generator in response to said error signal. Preferably, the threshold detector determines whether the equalizer output would have been decoded improperly during a synchronization symbol, and if so, enables the use of the second update increment in the generator filter.

26 Claims, 3 Drawing Sheets

METHOD AND APPARATUS FOR FAULT RECOVERY IN A DECISION FEEDBACK EQUALIZER

BACKGROUND OF THE INVENTION

A. Field of the Invention

The present invention relates to a method and device for compensating for channel distortion in a communication receiver. Specifically the invention relates to an equalization method and structure for equalizing the receive data to compensate for channel distortion in DMT communication system as typically used in ADSL transceivers.

B. Description of the Related Art

1. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium.

ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

2. Discrete Multi-Tone Modulation

Discrete Multi-Tone (DMT) uses a large number of sub-carriers spaced close together. Each subcarrier is modulated using a type of Quadrature Amplitude Modulation (QAM). Alternative types of modulation include Multiple Phase Shift Keying (MPSK), including BPSK and QPSK, and Differential Phase Shift Keying (DPSK). The data bits are mapped to a series of symbols in the I-Q complex plane, and each symbol is used to modulate the amplitude and phase of one of the multiple tones, or carriers. The symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band.

Because the symbol time is relatively long and follows a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension at the end of each symbol, in order to maintain orthogonality.

In standard DMT modulation, each N-sample encoded symbol is prefixed with a cyclic extension to allow signal recovery using the cyclic convolution property of the discrete Fourier transform (DFT). Of course, the extension may be appended to the end of the signal as well. If the length of the cyclic prefix, L, is greater than or equal to the length of the impulse response, the linear convolution of the transmitted signal with the channel becomes equivalent to circular convolution (disregarding the prefix). The frequency indexed DFT output sub-symbols are merely scaled in magnitude and rotated in phase from their respective encoded values by the circular convolution. It has been shown that if the channel impulse response is shorter than the length of the periodic extension, sub-channel isolation is achieved. Thus, the original symbols can then be recovered by transforming the received time domain signal to the frequency domain using the DFT, and performing equalization using a bank of single tap frequency domain equalizer (FEQ) filters. The FEQ effectively deconvolves (circularly) the signal from the transmission channel response. This normalizes the DFT coefficients allowing uniform QAM decoding.

Such an FEQ is shown in FIG. 1. The FFT calculator 20 accepts received time domain signals from line 10, and converts them to frequency domain representations of the symbols. Each frequency bin (or output) of the FFT 20 corresponds to the magnitude and phase of the carrier at the corresponding frequency. In FIG. 2, each bin therefore contains a separate symbol value X(i) for the $i^{th}$ carrier. The frequency domain equalizer FEQ 40 then operates on each of the FFT outputs with a single-tap filter to generate the equalized symbol values X'(i). The equalized symbol values may then be decoded by a slicer and demapper. The prior art frequency domain equalizer FEQ 40 of FIG. 2 suffers from technical disadvantages, as will become apparent in the following description.

SUMMARY OF THE INVENTION

An efficient and reliable method of using synchronization symbols to realize decision-feedback equalizer fault recovery while not disturbing the signal to noise ratio performance is provided. The method and apparatus uses aggressive decision-directed frequency domain equalizer (FEQ) adaptation during synchronization symbol intervals. It provides performance and reliability advantages in multicarrier communications systems such as ADSL modems.

The FEQ fault recovery is realized with aggressive forced adaptation using a derived signal during the ADSL synchronization symbol preferably only when a fault is detected. Faults are detected by calculating the minimum magnitude of constellation errors corresponding to faults when the showtime FEQ taps are used in the modified synchronization symbol receiver. The method utilizes the same FEQ taps that are used during normal data transmission mode ("showtime") during the synchronization symbol intervals. The taps are used to equalize the received synchronization symbols and the equalized output is compared to a derived reference synchronization signal. If a decision error would have resulted (e.g., in the showtime data slicer), it is determined that the the continued use of the FEQ taps would result in decision error propogation. The FEQ taps are therefore aggressively updated during the synchronization symbol interval. The FEQ tap updates can also be updated during a synchronization symbol using data re-use, i.e., performing multiple updates using the same synchronization symbol inputs. A data re-using LMS algorithm for the coefficient recursion is preferred, and it allows single synchronization symbol recovery when adequate computer run-time is available.

The fault recovery mechanism also allows more aggressive showtime tracking of any time variation of the channel because of the lessened concern of decision feedback error propagation. By calculating the magnitude of error signals corresponding to FEQ outputs, the forced adaptation of FEQ taps during the synchronization symbol can be disabled during fault-free operation, thereby reducing SNR performance degradation introduced by aggressive LMS updates. Alternatively, a normal update may be performed during the synchronization symbol.

BRIEF DESCRIPTION OF THE DRAWINGS

The objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
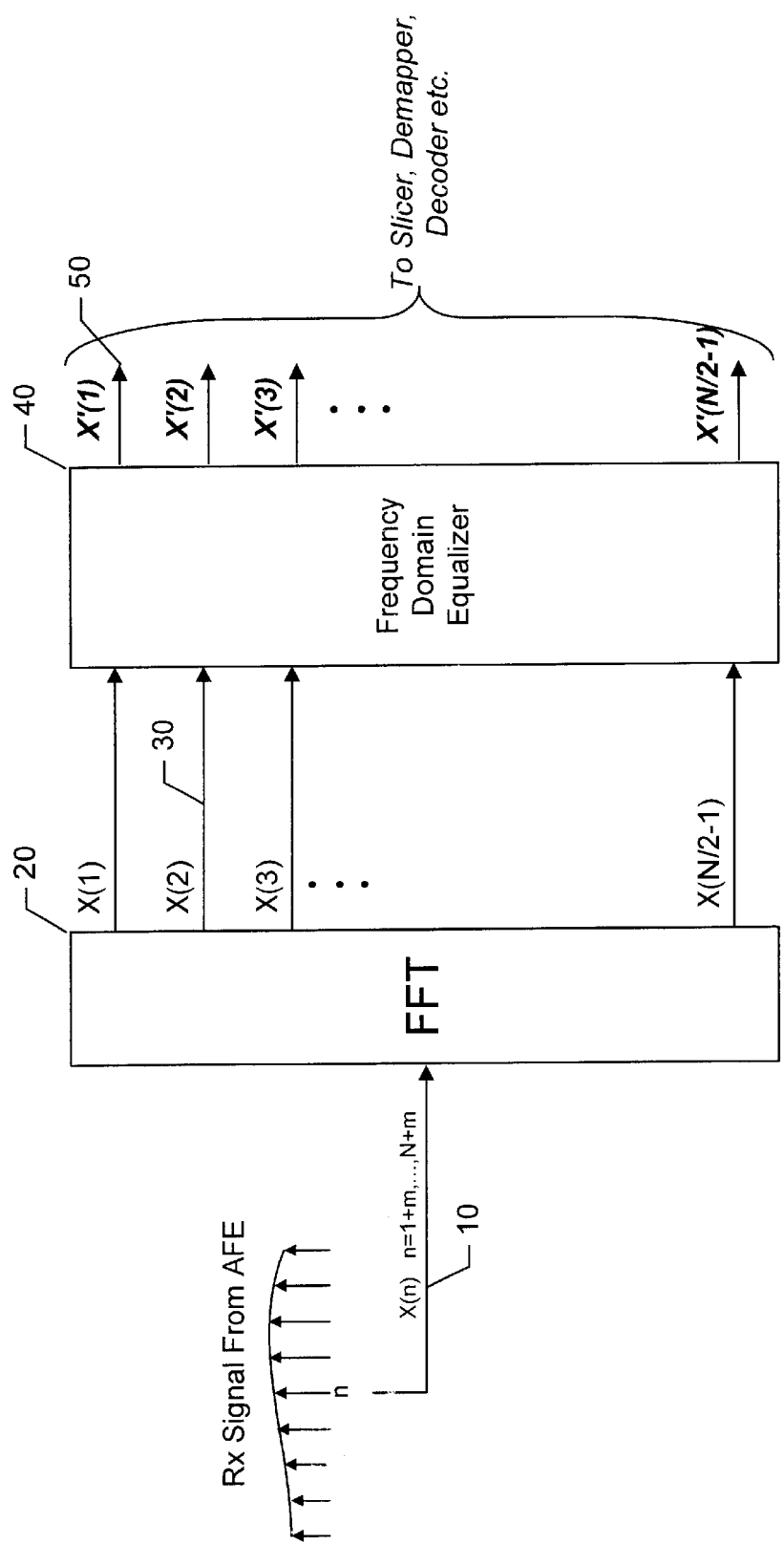
FIG. 1 depicts a prior art frequency domain equalizer.

The frequency domain equalizer (FEQ) inverts the residual frequency response of the effective channel from the far end DMT transmitter to the input of the FFT in the near end receiver. The received time domain signal is converted to the frequency domain, where the FEQ performs the equalization function. The FEQ outputs are then decoded by a slicer, or data decision device. The FEQ taps can be updated, and can make use of the slicer output. That is, the FEQ taps may be updated so as to minimize the error between the FEQ output and the slicer output. This is commonly referred to as decision feedback equalization, or decision-directed adaptation.

Decision-directed adaptation, however, may cause faults when decoding errors are present. If a decoder decision is wrong, the decision-directed adaptive filter is driven away from its correct value since the direction of the reference signal error vector is generally away from the correct decision point instead of towards it. If the step size is large enough to cause the FEQ tap to change enough so that the next received constellation point is decoded erroneously, then the tap is stuck at a wrong value and a decision-directed system cannot recover. This is referred to as error propagation. The FEQ is best able to track timing jitter with an aggressive decision-directed FEQ update during data transmission mode, or "showtime". More aggressive updates have the negative effect of increasing the likelihood that an error event will cause an FEQ fault.

The frequency domain equalizer disclosed herein is intended for use in a receiver in a multicarrier transmission system. In particular, the equalizer apparatus and methods have been implemented in a system compatible with ADSL transmission protocols, as set forth in ANSI specification T1.413. The apparatus and methods are also well suited for other discrete multi-tone or orthogonal frequency division modulation (OFDM) systems.

In ADSL, the magnitude of the symbols transmitted on each sub-carrier are determined by a number of factors including bit loading, gain factors and power normalization. Each sub-carrier "i" is loaded with $b_d(i)$ bits during data transmission. The bit loading is determined during an initialization period, and depends largely on the signal to noise ratio for the particular sub-carrier. The bit loading affects the size of the constellation used to transmit the data. Due to the varying constellation sizes, each sub-carrier has an associated constellation normalization factor of $C_N(b_d(i))$. The normalization factor is a power normalization factor that makes the average power of each sub-carrier equal, or approximately equal. This is necessary because the signal point constellations are typically formed on an odd integer grid. Without power normalization, carriers having large constellations would have significantly more power than those with smaller constellations. Further, the data symbols on a given sub-carrier "i" may be scaled in magnitude by gain $g_d(i)$. In ANSI T1.413 an array of fine tuning gain factors are applied at the transmitter IFFT input for the purpose of equalizing the bit-error rates across the spectrum of active carriers. These gain factors are typically range between +2.5 dB and −2.5 dB.

Considering the various factors, the IFFT input for carrier "i" may be modeled as: $g_d(i) \, C_N(b_d(i)) \, [x(i)+jy(i)]$, where $g_d(i)$ represent the fine gain factors, $C_N(b_d(i))$ represents the constellation normalization factor, and $x(i)+jy(i)$ represents the real and imaginary components of the data symbol. Again, the complex-valued data symbol represents the magnitude and phase of the corresponding sub-carrier. The transmission channel characterized by H(w) also distorts the magnitude and phase of the transmitted symbols.

Figure 2:
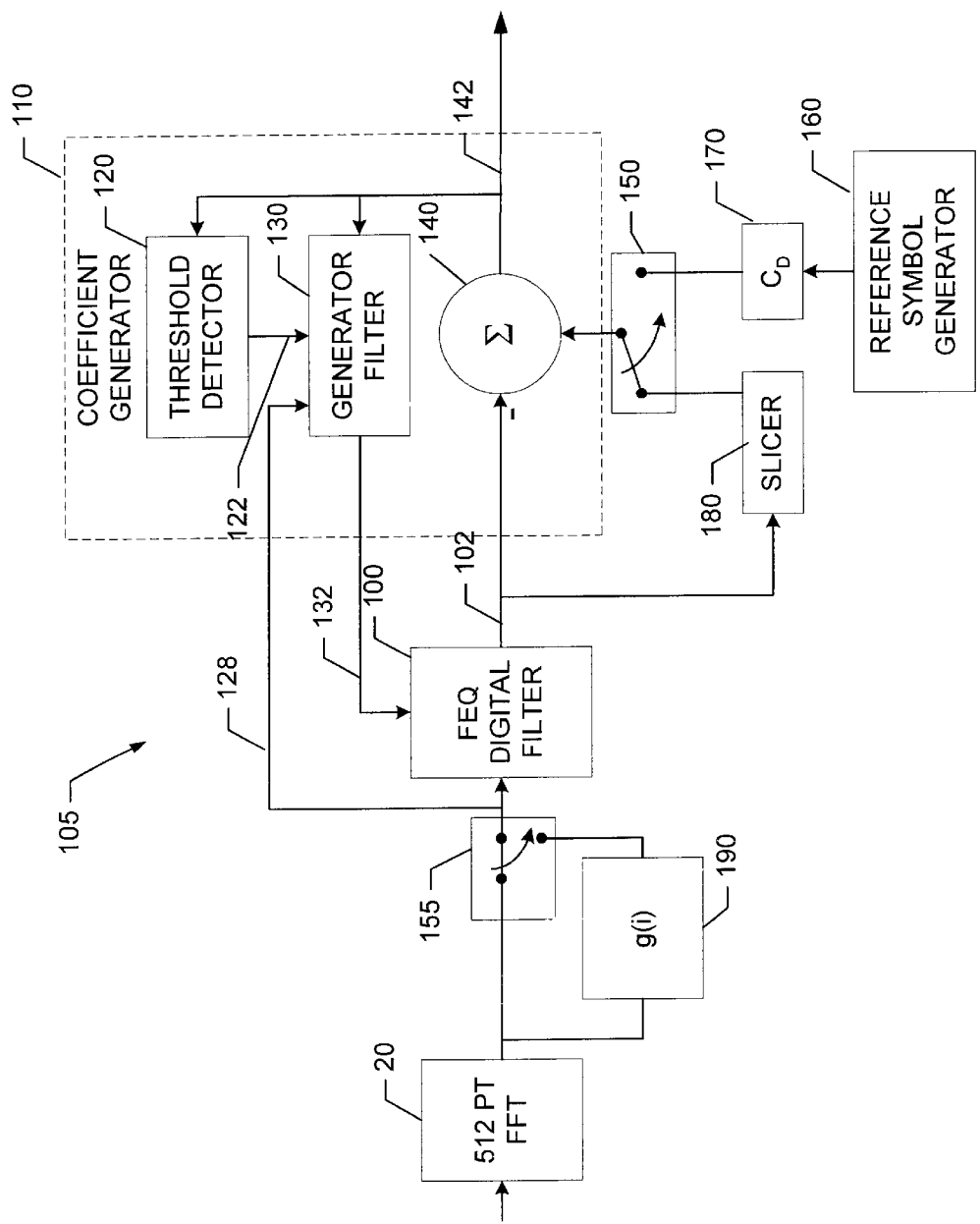
FIG. 2 shows the decision feedback frequency domain equalizer of the present invention; and, FIG. 3 shows a flowchart of the equalization methods disclosed herein.

The frequency domain equalizer 105, shown in FIG. 2, preferably corrects for all these factor simultaneously. FEQ 105 includes FEQ filter 100 and coefficient generator 110. Coefficient generator 110 also includes threshold detector 120, generator filter 130, and error generator 140. Also depicted are the reference symbol generator 160, the gain compensator 190, reference selector 150, gain compensation selector 155, slicer 180, reference symbol modifier 170 and FFT module 20.

The filter taps in FEQ filter 100 preferably compensate for the fine gain factors, the constellation normalization, and the channel distortion. The tap for bin i (or sub-carrier i), F(i) can be expressed as:

$$F(i) = C_D(b_d(i)) g^{-1}(i) H^{-1}(\omega_i),$$

where $C_D(b_d(i))$ is the constellation power denormalization scale factor for a constellation with $b_d(i)$ bits (where $C_D(b_d(i))=1/C_N(b_d(i)))$, $g^{-1}(i)$ is the inverse of the gain factors g(i), and $H^{-1}(\omega_i)$ is the inverse of the channel characteristic, or stated differently, the channel compensation at $\omega_i$ for carrier "i".

The FEQ taps therefore correct for all the distortion factors with a single complex multiplication that scales and rotates each symbol and presents its output to the slicer on a normalized odd integer grid.

The ADSL transmission signals have synchronization symbols periodically embedded within the data. The ANSI specification T1.413 defines the use of a synchronization frame containing synchronization symbols on all of the sub-carriers. These synchronization symbols are known to the receiver because they are of a predetermined value. Specifically, ANSI T1.413 defines a pseudo-random data symbol to be transmitted during the data transmission mode after every 68 data symbol frames. Therefore, every $69^{th}$ symbol frame after the transition to data transmission mode is known to the receiver.

The synchronization frame symbol consists of DMT symbols on each sub-carrier with the same characteristics as the data symbols except that each carrier is modulated by a two bit pseudo-random constellation with all fine gains g(i) set to 1.0. The pseudo-random bit pattern is defined by the standard as p(n)=1 for n=1 to 9 and p(n)=p(n-4)+p(n-9) for n=10 to 512. Thus, sync symbols consist of QPSK sub-symbols with g(i)=1.0 and 2-bit power normalization. It should be noted that 2-bit power normalization does not require a special normalization factor (or, $C_N$=1), given that the two-bit symbols are already normalized.

The FEQ digital filter 100 has a plurality of single-tap filters, one for each subcarrier. The digital filter 100 accepts frequency domain representations of received symbols from the FFT module 20, and provides equalized frequency domain symbols. The coefficient generator 130 is connected to the FEQ digital filter 100 and accepts the equalized frequency domain symbols from the filter 100. The generator filter also receives an error input on line 142 from the error generator 140. The error is calculated by determining the difference between the input to the slicer (i.e., the equalized symbols from FEQ filter 100) and the slicer 180 output routed by selector 150. The generator filter performs an adaptive steepest descent/gradient-based algorithm, of which there are many. The well-known least-mean-squared (LMS) algorithm is preferred due to its computational efficiency. The LMS algorithm uses an easily calculated estimate of the gradient consisting of the product of the error and the FEQ filter input, provided on line 128. The update equation is:

$$F_{n+1}(i) = F_n(i) + \frac{\mu}{\sigma^2(i)} e_n(i) X_n^*(i),$$

where $F_{n+1}(i)$ is the new coefficient for sub-carrier i, $F_n(i)$ is the old coefficient, $\mu$ is the step size, or increment value, $e_n(i)$ is the error for the ith sub-carrier at time n, $X_n^*(i)$ is the complex conjugate of the input to the FEQ for sub-carrier i, and $\sigma^2(i)$ is the power of the input signal. Note that the inclusion of the power in the algorithm merely provides power normalization. Preferably the update term is rounded to prevent coefficient creep under constant-input circumstances.

During the reception of a synchronization frame, the gain compensator is activated by gain compensator selector switch 155. The gain compensator 190 removes the g(i) component within the FEQ filter taps for each subcarrier. This is necessary because the fine constellation gains g(i) are all set to unity at the transmitter during the synchronization symbol. Thus the FFT output for each carrier during synchronization symbols is scaled by $g_d(i)$ to compensates for the $1/g_d(i)$ term incorporated in the showtime FEQ taps. Of course, the data mode FEQ filter need not include the gain factors ($g^{-1}$ term), in which case the gain compensator 190 and the switch 155 would not be needed during the synchronization symbol frame.

During the reception of a synchronization symbol, the reference symbol generator provides reference symbols that are identical to the predetermined symbols, or synchronization symbols, used by the transmitter. However, because the FEQ taps include a showtime denormalization factor, $C_D(b_d(i))$, which is not present during a synchronization symbol, the reference symbol generator 160 is followed by reference symbol modifier 170. Reference symbol modifier 170 applies the showtime denormalization factor $C_D(b_d(i))$. Therefore the reference signal for carrier "i" is $r(i)=C_d(b_d(i))[x_s(i)+jy_s(i)]$.

During the synchronization symbol, the coefficient generator 130 is connected to the reference symbol generator 160 by way of reference selector 150. The coefficient generator filter 130 accepts the equalized frequency domain symbols from the digital filter 100 and reference symbols from the reference symbol generator 160 by way of error generator 140. The coefficient generator filter 130 also accepts the data input to the FEQ filter (input 128), and updates the filter taps in FEQ digital filter 100 in response to the error signal. Generally speaking, the error generator provides an error signal indicative of the convergence of the frequency domain equalizer.

When a synchronization symbol has been received, the error signal on line 142 is analyzed by the error threshold detector 120. The error threshold detector directs the coefficient generator to perform an aggressive update, preferably only if the error indicates that the FEQ filter output would have been decoded as an error in slicer 180. The determination of whether an error would have occurred is made by examining the magnitude of the error, and comparing it to the showtime $d_{min}/2$. Recall that the ADSL constellations are defined on a grid with decision levels at odd integer values and decision boundaries at even integer values. Therefore the minimum spacing between constellation points is 2, and $d_{min}/2=1$. Also recall that during the synchronization symbol the FEQ is modified (compared to showtime) by inserting a fine gain stage between the FFT and the FEQ filter to account for the gain factors embedded in the showtime FEQ filter. This has the effect of modifying the minimum spacing during a synchronization symbol to $2g_d(i)$. Another interpretation is that the gain compensator 190 effectively increases the noise magnitude during a synchronization symbol compared to the noise present during showtime. The minimum distance from a decision level to a decision boundary is therefore $g_d(i)$. Thus, for each synchronization symbol carrier the method tests the following condition, $$\|e(i)\|^2 = [x_f(i)+jy_f(i)][x_f(i)-jy_f(i)] > [g_d(i)]^2$$

where $x_f(i)$ and $y_f(i)$ are the real and imaginary components of the FEQ error (reference symbol-FEQ filter output). If this condition is met, it indicates that an error would have occurred in the slicer, causing the FEQ aggressive adaptation procedure to be initiated for that carrier.

As stated above, the synchronization symbol updates are preferably dependent upon whether a slicer error would have occurred. This is because continued aggressive FEQ updates can cause reduced showtime performance because of the effect of noise on the LMS recursion. Furthermore, by calculating the euclidean norm of the FEQ error vector and comparing it to the minimum spacing between adjacent constellation points for each showtime constellation, the equalizer can estimate whether or not an FEQ fault is likely to have occurred. The update can either be disabled for the current synchronization symbol if the error threshold has not been satisfied, or a normal update may be performed using the normal update increment value.

The update preferably uses the same algorithm that is used during showtime, preferably the LMS algorithm. The update during the synchronization symbol is more aggressive than during showtime to ensure fault recovery based on the relatively few synchronization symbol frames per regular data frames. The update is made more aggressive by using a larger value for $\mu$. As described herein, an update increment value of $\mu_1$ is used during showtime updates, while a larger value $\mu_2$ is used during the synchronization symbol updates. Thus, $\mu_1 < \mu_2$, and preferably $\mu_2$ is four to eight times greater than $\mu_1$. Obviously, the exact ratio of $\mu_2/\mu_1$ will depend on various design criteria, the objective being that the rate of convergence is preferred to have a higher value during the synchronization symbol.

The rate of convergence during synchronization symbol adaptation can also be increased by employing a data re-using LMS algorithm in which the taps are updated multiple times in a single symbol. After each coefficient update, a new filter output signal is calculated and used to drive an additional update. For each update the error threshold is preferably examined to prevent over-compensation and over-reliance on noisy estimates (i.e., received signals). In addition, the FEQ could also be adjusted using the closed form expression $F_{n+1}(i) = $(FEQ reference)/(FEQ input), which is the most aggressive type of update.

Figure 3:
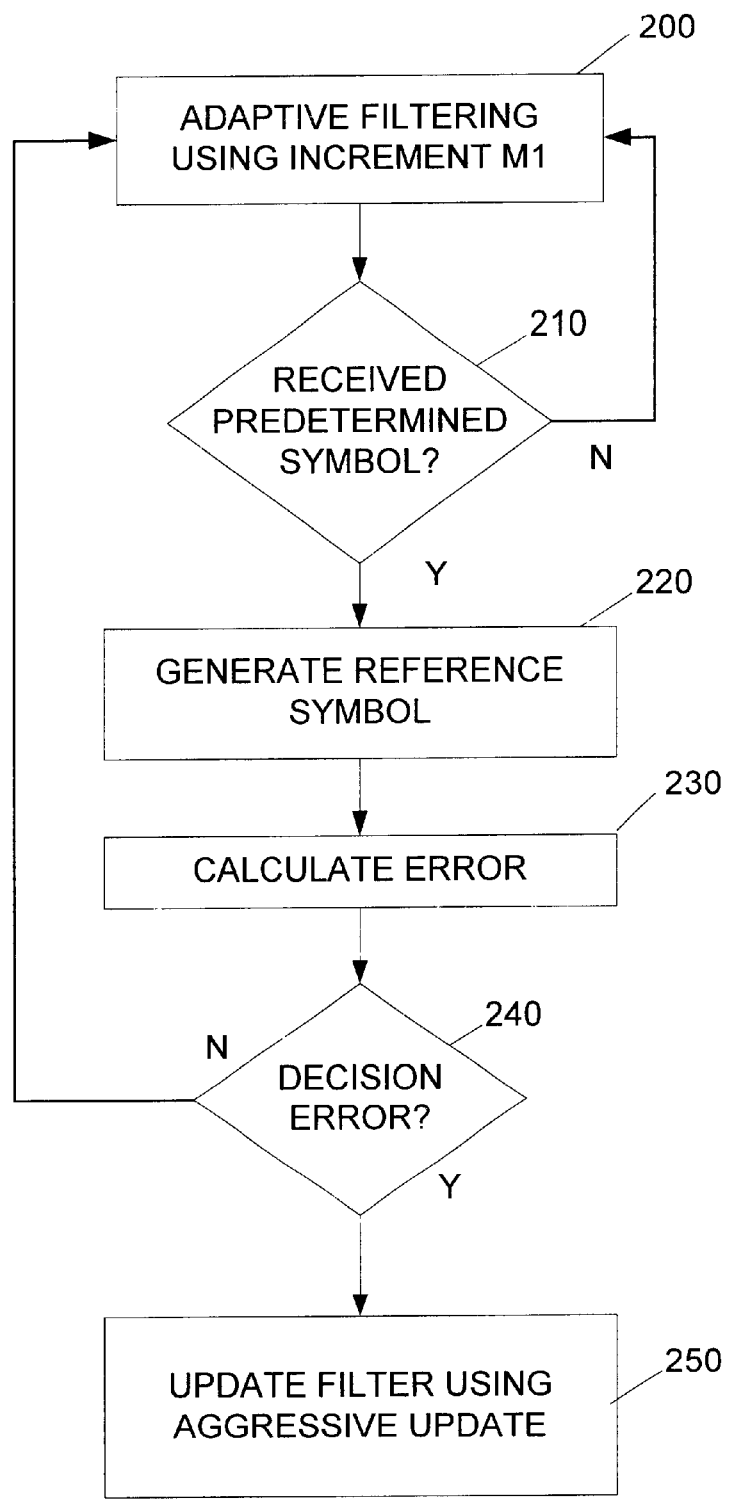

With reference to FIG. 3, the method of equalizing a sequence of received symbols is described. At step 200 the received signal is adaptively filtered. The filtered signals are representation of the symbols in the frequency domain, and the filtering is performed using the single-tap filters of the FEQ filter 100. The adaptive filtering is based in part on decision feedback information, and update filter increment value is $\mu_1$. At step 210, a determination is made whether a predetermined symbol has been received. If one has not been received then normal DFE adaptive filtering is continued. If, on the other hand, a synchronization symbol has been received, at step 210 the reference symbols are generated. This step may include modifying the level of the reference symbol so that it is on the same overall decision grid at the equalized received synchronization symbol. At step 230 an error is calculated in response to the filtered predetermined synchronization symbol and the reference symbols. The error is preferably the Euclidean difference between the reference symbols and the filtered predetermined synchronization symbol. At step 240 the error is analyzed, or compared to a threshold, to determine if a decision error would have resulted. The threshold is preferably given by the equation:

$$\|e(i)\|^2 = [x_f(i) + jy_f(i)][x_f(i) - jy_f(i)] > [g_d(i)]^2$$

If an error would not have occurred, the adpative filter can either perform an update using the update filter increment $\mu_1$, or not perform any update at all. If, on the other hand, an error would have been generated, the update is performed using an aggressive update. This may be performed by using a filter increment $\mu_2$, at step 250. Preferably, $\mu_2$ is greater than $\mu_1$, and more specifically, is greater by a factor of between four and eight.

The aggressive update of step 250 may also be performed by implementing a data reuse update. That is, each of the single-tap filters are updated by performing two update iterations using a single received predetermined symbol. Even if the same $\mu_1$ value is utilized, it will result in a more aggressive update. Preferably, the higher value of $\mu_2$ is used, and the data reuse is performed if processor time is available. Preferably, the error is recalculated before each of the update iterations, and are only performed if the corresponding error exceeds the threshold for that iteration. A third alternative for the aggressive update step, as stated above, is an adjustment of the FEQ taps using the closed form expression $F_{n+1}(i) = $(FEQ reference)/(FEQ input), which is the most aggressive type of update.

A preferred embodiment of the present invention has been described herein. It is to be understood, of course, that changes and modifications may be made in the embodiment without departing from the true scope of the present invention, as defined by the appended claims. The present embodiment preferably includes logic to implement the described methods in software modules as a set of computer executable software instructions. The Computer Processing Unit ("CPU") or microprocessor implements the logic that controls the operation of the transceiver. The microprocessor executes software that can be programmed by those of skill in the art to provide the described functionality.

The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

Those methods stored on a computer readable medium may be used to cause a microprocessor to perform those steps. The medium may also contain a data structure, where the data structure includes information used by a communication transceiver, including equalization filter coefficients, an update error threshold, and a first and second update increment value.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry. In particular, it is understood that the filter structures described herein may be implemented in dedicated hardware such as an ASIC, or as program instructions carried out by a microprocessor.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A frequency domain equalizer for use in a receiver in a multicarrier transmission system characterized by predetermined symbols being periodically embedded in the transmissions, said equalizer comprising:
   a digital filter having a plurality of single-tap filters, wherein said digital filter accepts frequency domain representations of received symbols and provides equalized frequency domain symbols;
   a reference symbol generator providing reference symbols;
   a coefficient generator connected to said digital filter and said reference symbol generator, said coefficient generator accepting the equalized frequency domain symbols from said digital filter and said reference symbols, wherein the coefficient generator further comprises a generator filter; and
   wherein said coefficient generator updates said plurality of filter taps in response to the equalized frequency domain symbols and wherein said coefficient generator updates said plurality of taps also in response to said reference symbols when said received symbol is a predetermined symbol.

2. The frequency domain equalizer of claim 1, wherein the generator filter generates new coefficients using an adaptive updating algorithm.

3. The frequency domain equalizer of claim 1, wherein the coefficient generator further comprises an error generator, said error generator providing an error signal indicative of the convergence of the frequency domain equalizer.

4. The frequency domain equalizer of claim 3, wherein the coefficient generator further comprises an error threshold detector connected to said error generator wherein said error threshold detector directs the coefficient generator to perform an aggressive update.

5. The frequency domain equalizer of claim 4 wherein said threshold detector directs the coefficient generator to perform an aggressive update only when a synchronization symbol was received.

6. The frequency domain equalizer of claim 4 wherein said threshold detector directs the coefficient generator to perform an aggressive update only when a synchronization symbol was received and the equalized synchronization symbol would have been decoded improperly.

7. The frequency domain equalizer of claim 3, wherein said digital filter receives said predetermined symbols during a synchronization interval, and wherein said coefficient generator updates said plurality of filter taps during the synchronization symbol interval.

8. The frequency domain equalizer of claim 7, wherein the error generator determines that an error would have occurred if the equalized frequency domain symbols were decoded, the error determination made by calculating a magnitude of spacing between constellation points during the synchronization symbol interval and comparing the magnitude of spacing between constellation points to the error signal to determine if an error threshold has been satisfied.

9. The frequency domain equalizer of claim 1 further comprising a reference selector, said reference selector selectively connecting said symbol reference generator to said coefficient generator.

10. The frequency domain equalizer of claim 1 further comprising a synchronization symbol gain compensator connected to said digital filter for imposing gain factors on the frequency domain representations of received symbols.

11. A method of equalizing a sequence of received symbols including predetermined symbols comprising the steps of:
   adaptively filtering the symbols in the frequency domain using at least one single-tap filter, wherein the adaptive filtering is based in part on decision feedback information, and wherein the update filter increment value is $\mu_1$;
   determining whether a predetermined symbol has been received, and if so:
   generating at least one reference symbol;
   calculating an error in response to the filtered predetermined symbol and the at least one reference symbol;
   updating the at least one single-tap filter in response to the error using an aggressive update algorithm.

12. The method of claim 11, wherein the at least one single-tap filter comprises a plurality of single-tap filters, one for each of a plurality of carriers in a multi-carrier communication system.

13. The method of claim 11, further comprising the step of determining an error threshold, and wherein the step of updating the at least one single-tap filter is performed only if the error exceeds the threshold.

14. The method of claim 13, wherein the calculated error is the difference between the equalized predetermined symbol and the reference symbol.

15. The method of claim 11, wherein the step of adaptively filtering includes performing an adaptive gradient algorithm update.

16. The method of claim 11, wherein the step of updating the at least one single-tap filter includes performing an LMS algorithm update.

17. The method of claim 11, wherein the aggressive update is performed with a filter increment $\mu_2$, wherein $\mu_2$ is greater than $\mu_1$.

18. The method of claim 17, wherein $\mu_2$ is four to eight times greater than $\mu_1$.

19. The method of claim 11, further comprising the step of modifying the scale of at least one of the reference symbol and the received symbol to ensure comparable scaling.

20. The method of claim 11, wherein the step of updating the at least one single-tap filter includes performing two update iterations using a single received predetermined symbol.

21. The method of claim 20, further comprising the step of determining an error threshold for each update iteration, and wherein each of the update iterations are performed only if the corresponding error exceeds the threshold.

22. A computer readable medium containing instructions that will cause a microprocessor to perform the steps of claim 11.

23. The method of claim 11, further comprising determining an error threshold, and wherein the step of updating the at least one single-tap filter is performed if the error does not exceed the threshold.

24. A system comprising:

a processing unit; and machine language instructions stored in data storage executable by the processing unit to perform functions including:

adaptively filtering received symbols in the frequency domain using at least one single-tap filter, wherein the adaptive filtering is based in part on decision feedback information, and wherein the update filter increment value is $\mu_1$;

determining whether a predetermined symbol has been received, and if so:

generating at least one reference symbol;

calculating an error in response to the filtered predetermined symbol and the at least one reference symbol; and updating the at least one single-tap filter in response to the error using an aggressive update algorithm.

25. The system of claim 24, wherein the machine language instructions further perform functions including determining an error threshold, and wherein the function of updating the at least one single-tap filter is performed only if the error exceeds the threshold.

26. The system of claim 24, wherein the machine language instructions further perform functions including modifying the scale of at least one of the reference symbol and the received symbol to ensure comparable scaling.

* * * * *